United States Patent
Latwesen et al.

(10) Patent No.: US 6,466,893 B1
(45) Date of Patent: *Oct. 15, 2002

(54) STATISTICAL DETERMINATION OF ESTIMATES OF PROCESS CONTROL LOOP PARAMETERS

(75) Inventors: Annette L. Latwesen, Marshalltown, IA (US); Kenneth W. Junk, Marshalltown, IA (US)

(73) Assignee: Fisher Controls International, Inc., Clayton, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/370,474

(22) Filed: Aug. 9, 1999

Related U.S. Application Data

(63) Continuation-in-part of application No. 08/939,364, filed on Sep. 29, 1997, now Pat. No. 5,966,679.
(60) Provisional application No. 60/098,464, filed on Aug. 31, 1998.

(51) Int. Cl.$^7$ .............................................. G01M 19/00
(52) U.S. Cl. ..................... 702/179; 702/105; 702/41; 700/282; 73/168
(58) Field of Search ................... 702/179, 109, 702/105, 41, 184; 700/282, 9; 73/168; 706/915

(56) References Cited

U.S. PATENT DOCUMENTS

| | | | |
|---|---|---|---|
| 4,029,122 A | 6/1977 | Jaegtnes | 137/551 |
| 4,313,465 A | 2/1982 | Holzem et al. | 137/599 |
| 4,376,450 A | 3/1983 | Fayfield et al. | 137/554 |
| 4,523,286 A | 6/1985 | Koga et al. | 364/494 |
| 4,542,649 A | 9/1985 | Charbonneau et al. | 73/168 |
| 4,555,766 A | 11/1985 | Wright | 364/426 |
| 4,556,956 A | 12/1985 | Dickenson et al. | 364/162 |
| 4,590,963 A | 5/1986 | Gardner et al. | 137/554 |
| 4,615,722 A | 10/1986 | Steffan et al. | 65/158 |
| 4,617,960 A | 10/1986 | More | 137/554 |
| 4,660,416 A | 4/1987 | Charbonneau et al. | 73/168 |
| 4,672,529 A | 6/1987 | Kupersmit | 364/130 |
| 4,690,003 A | 9/1987 | McNennamy et al. | 73/862.32 |
| 4,693,113 A | 9/1987 | McNennamy et al. | 73/168 |
| 4,694,390 A | 9/1987 | Lee | 364/165 |
| 4,694,391 A | 9/1987 | Guttag et al. | 364/200 |
| 4,712,071 A | 12/1987 | Charbonneau et al. | 324/415 |
| 4,742,713 A | 5/1988 | Abe et al. | 73/620 |
| 4,831,873 A | 5/1989 | Charbonneau et al. | 73/168 |
| 4,833,593 A | 5/1989 | Takeuchi et al. | 364/191 |
| 4,858,103 A | 8/1989 | Takeuchi et al. | 364/174 |
| 4,908,774 A | 3/1990 | Lund et al. | 364/507 |

(List continued on next page.)

FOREIGN PATENT DOCUMENTS

| | | |
|---|---|---|
| DE | 42 18 320 A1 | 6/1992 |
| DE | 42 32 826 C1 | 9/1992 |
| EP | 0 275 629 A1 | 7/1988 |

(List continued on next page.)

OTHER PUBLICATIONS

Anderson, "The Deviation Cycle," *ISA Journal*, pp. 49–51 (1966).

(List continued on next page.)

Primary Examiner—Bryan Bui
Assistant Examiner—Hien Vo
(74) *Attorney, Agent, or Firm*—Marshall, Gerstein & Borun.

(57) ABSTRACT

A method and apparatus statistically determines estimates of one or more process control loop parameters, such as bearing friction, seal friction, total friction, dead band, dead time, oscillation, shaft windup or backlash associated with a device or a control loop within a process control environment. The method and apparatus measures one or more signals within a process control loop when the process control loop is connected on-line within a process control environment, stores the measured signal as signal data and then performs one of a number of statistical analyses on the stored signal data to determine the desired parameter estimate.

53 Claims, 6 Drawing Sheets

U.S. PATENT DOCUMENTS

| | | | |
|---|---|---|---|
| 4,908,775 A | 3/1990 | Palusamy et al. ............ | 364/508 |
| 4,916,628 A | 4/1990 | Kugler ........................ | 364/492 |
| 4,926,903 A | 5/1990 | Kawai ......................... | 137/554 |
| 4,949,288 A | 8/1990 | Bookout ...................... | 364/558 |
| 4,976,144 A | 12/1990 | Fitzgerald .................... | 73/168 |
| 4,977,778 A | 12/1990 | Nafziger et al. .............. | 73/597 |
| 4,980,825 A | 12/1990 | Tootell et al. ............... | 364/580 |
| 5,000,040 A | 3/1991 | Charbonneau et al. ........ | 73/168 |
| 5,086,273 A | 2/1992 | Leon ........................... | 324/207 |
| 5,109,692 A | 5/1992 | Fitzgerald .................... | 73/168 |
| 5,140,263 A | 8/1992 | Leon ........................... | 324/207 |
| 5,154,080 A | 10/1992 | Hill et al. .................... | 73/597 |
| 5,159,835 A | 11/1992 | Nafziger et al. .............. | 73/584 |
| 5,197,328 A | 3/1993 | Fitzgerald .................... | 73/168 |
| 5,198,973 A | 3/1993 | Stautermann .......... | 364/167.01 |
| 5,228,342 A | 7/1993 | McShane ..................... | 73/597 |
| 5,233,542 A | 8/1993 | Höhner et al. ......... | 364/551.01 |
| 5,251,148 A | 10/1993 | Haines et al. .............. | 364/509 |
| 5,253,185 A | 10/1993 | Mutchler et al. ...... | 364/551.01 |
| 5,272,647 A | 12/1993 | Hayes .................. | 364/551.01 |
| 5,320,123 A | 6/1994 | Corso et al. ................... | 137/1 |
| 5,329,465 A | 7/1994 | Arcella et al. ......... | 364/551.01 |
| 5,329,956 A | 7/1994 | Marriott et al. .............. | 137/15 |
| 5,337,262 A | 8/1994 | Luthi et al. ................. | 364/580 |
| 5,396,167 A | 3/1995 | Leon .......................... | 324/73.1 |
| 5,414,648 A | 5/1995 | Morgan et al. ............. | 364/563 |
| 5,425,270 A | 6/1995 | McDonald et al. ........... | 73/168 |
| 5,433,245 A | 7/1995 | Prather et al. ............... | 137/554 |
| 5,451,923 A | 9/1995 | Seberger et al. ........ | 340/310.06 |
| 5,475,299 A | 12/1995 | Leon .......................... | 324/73.1 |
| 5,477,149 A | 12/1995 | Spencer et al. ............. | 324/418 |
| 5,487,302 A | 1/1996 | Casada et al. ................ | 73/168 |
| 5,553,153 A | 9/1996 | Eatwell ....................... | 381/71 |
| 5,555,171 A | 9/1996 | Sonehara et al. ...... | 364/424.03 |
| 5,557,546 A | 9/1996 | Fukai et al. ........... | 364/551.01 |
| 5,564,470 A | 10/1996 | Denmark et al. ........... | 137/554 |
| 5,586,305 A | 12/1996 | Eidson et al. ............... | 395/500 |
| 5,687,098 A | 11/1997 | Grumstrup et al. .... | 364/551.01 |
| 5,838,561 A | 11/1998 | Owen ......................... | 364/152 |
| 5,966,679 A | 10/1999 | Snowbarger et al. ....... | 702/105 |

FOREIGN PATENT DOCUMENTS

| | | |
|---|---|---|
| EP | 0 315 391 A2 | 5/1989 |
| EP | 0 334 698 A2 | 9/1989 |
| EP | 0 462 432 A2 | 12/1991 |
| EP | 0 572 245 A2 | 1/1993 |
| EP | 0 572 245 A2 | 12/1993 |
| EP | 0 637 713 A1 | 2/1995 |
| EP | 0 660 017 A1 | 6/1995 |
| EP | 0 708 389 | 4/1996 |
| GB | 2 194 648 A | 3/1988 |
| GB | 2 196 445 A | 4/1988 |
| JP | 62 229 044 A | 10/1987 |
| WO | WO 97/16776 A | 5/1997 |
| WO | WO 99/17177 | 8/1999 |

OTHER PUBLICATIONS

Beatty, "Intelligent Valve Based Process Sensing and Control," *ISA, 46 Advances in Instrumentation and Control* No, 2, pp. 1175–1185 (1991).

Charbonneau, "Early Diagnosis of Motor Operated Valve Mechanical and Electrical Degradations," The American Society of Mechanical Engineers, 84–NE–16, 1984.

Dimmick et al., "Ultrasonic Leak Detection Cuts Valve Maintenance Costs," Power Engineering, pp. 35–38, Aug. 1986.

Electric Power Research Institute, "Improvements in Motor–operated Valves," EPRI NP–4254, Nov. 1985.

Electric Power Research Institute, "Key Valves Prioritization Study," EPRI NP–3611, Oct. 1984.

FIELDVUE™, "Digital Valve Controller type DVC5000 Series," Instruction Manual, Jun. 1995.

FIELDVUE™, "Digital Vave Controller Type DVC5000 Series," Bulletin 62.1:DVC5000, Jun. 1994.

FIELDVUE™, "Digital Valve Controller DVC5000 Series Remotely Accessible Information," Bulletin 62.1:DVC5000(S1), Jun. 1994.

Isermann et al. "Adaptive Control Systems," Prentice Hall, pp. 488–492 and 528–531 (1992).

U.S. Patent Application Ser. No. 06/913,193, entitled "Motor Current Signature Analysis Method for Diagnosing Motor–Operated Devices".

PCT/US 98/19375 International Search Report dated Feb. 5, 1999.

PCT/US 98/19430 International Search Report, dated Jan. 5, 1999.

Skormin et al., "On–Line Diagnostics of a Self–Contained Flight Actuator," *IEEE Transactions on Aerospace and Electronic Systems*, vol. 30, No. 1, pp. 186–196, Jan. 1994.

PCT/US00/40613 International Search Report dated Dec. 19, 2000.

PCT/US00/40613 Written Opinion dated Mar. 5, 2001.

PCT International Preliminary Examination Report dated Sep. 14, 2001, PCT/US00/40613.

STATISTICAL DETERMINATION OF ESTIMATES OF PROCESS CONTROL LOOP PARAMETERS

RELATED APPLICATION

This is a continuation-in-part of U.S. patent application Ser. No. 08/939,364 filed Sep. 29, 1997 now U.S. Pat. No. 5,966,679 entitled "Method of and Apparatus for Non obtrusively Obtaining On-Line Measurements of a Process Control Device Parameter." This is also a regular filed application based on Provisional Application No. 60/098,464 filed Aug. 31, 1998 entitled "Statistical Determination of Estimates of Process Control Loop Parameters."

TECHNICAL FIELD

The present invention relates generally to process control networks and, more particularly, to a method of and an apparatus for statistically determining an estimate of a process control loop parameter while the process control loop is connected on-line within a process environment.

BACKGROUND ART

Large scale commercial manufacturing and refining processes typically use a process controller to control the operation of one or more process control devices such as valve mechanisms. In turn, each process control device controls one or more process variables comprising, for example, fluid flow, temperature, pressure, etc., within a process. Generally, process control devices such as valve positioners have an actuator controlled by a positioner that moves an associated control element, such as a valve plug, a damper, or some other alterable opening member, in response to a command signal generated by the process controller. The control element of a process control device may, for example, move in response to changing fluid pressure on a spring biased diaphragm or in response to the rotation of a shaft, each of which may be caused by a change in the command signal. In one standard valve mechanism, a command signal with a magnitude varying in the range of 4 to 20 mA (milliamperes) causes a positioner to alter the amount of fluid and thus, the fluid pressure, within a pressure chamber in proportion to the magnitude of the command signal. Changing fluid pressure in the pressure chamber causes a diaphragm to move against a bias spring which, in turn, causes movement of a valve plug coupled to the diaphragm.

Process control devices usually develop or produce a feedback signal, indicative of the response of the device to the command signal, and provide this feedback signal (or response indication) to the process controller for use in controlling a process. For example, valve mechanisms typically produce a feedback signal indicative of the position (e.g., travel) of a valve plug, the pressure within a fluid chamber of the valve or the value of some other phenomena related to the actual position of the valve plug.

While a process controller generally uses these feedback signals, along with other signals, as inputs to a highly tuned, centralized control algorithm that effects overall control of a process, it has been discovered that poor control loop performance may still be caused by poor operating conditions of the individual control devices connected within the control loop. In many cases, problems associated with one or more of the individual process control devices cannot be tuned out of the control loop by the process controller and, as a result, the poorly performing control loops are placed in manual or are detuned to the point where they are effectively in manual. The processes associated with these control loops require constant supervision by one or more experienced human operators, which is undesirable.

Poor control loop performance can usually be overcome by monitoring the operational condition or the "health" of each of the process control devices connected within the loop, or at least the most critical process control devices connected within the loop, and repairing or replacing the poorly performing process control devices. The health of a process control device can be determined by measuring one or more parameters associated with the process control device and determining if the one or more parameters is outside of an acceptable range.

One process control device or loop parameter that may be used to determine, and that is indicative of the health of a process control device such as a valve is a friction measurement. In general, the friction measurement relates to the amount of force or pressure that must be applied to a moving part of the device to overcome the force of friction, e.g., to begin initial movement of a valve plug. If the friction measurement of a device becomes greater than a set amount, it may mean that the valve plug is sticking for some reason and that, therefore, the device may need repair or replacement.

Another process control device parameter that may be used to determine, and that is indicative of the health of a process control device is dead band. Generally speaking, in process instrumentation, dead band is the range through which an input signal may be varied, upon reversal of direction, without initiating an observable change in an output signal. Dead band, which may be caused by the physical play between mechanically interconnected components, friction, and/or other known physical phenomena, is best observed when a command signal causes a reversal in the direction of movement of a moveable element of a process control device. During this reversal, the command signal undergoes a discrete amount of change (dead band) before the movable element of the process control device actually exhibits movement in the new direction. Put another way, the difference between the value of the command signal (or other control signal) at which movement of the process control device element in a first direction last occurred and the value of the command signal (or other control signal) at which the movement of the process control device element first occurs in a second and different direction is a measure of the dead band of the process control device.

Still other device parameters that may be used to determine the health of a process control device or loop are dead time, response time, oscillation, and shaft windup. Dead time is associated with, and may be considered to be a measurement of the amount of time it takes the process control device to actually begin moving a moveable element in response to a change in a control signal. Response time is the amount of time it takes the moveable element of a process control device to reach a certain percentage, for example 63 percent, of its final value in response to a change in a control signal. Oscillation is a measurement that determines if a signal associated with a process control device or loop is periodic and, therefore, has some oscillatory behavior, which is typically undesirable. Shaft windup is the actuator travel that occurs (typically in a rotary valve) before the applied pressure reaches an amount that overcomes the friction inherent in the mechanism.

If the friction, dead band, dead time, or some other process control loop parameter increases a significant amount over its calibrated value, it may be necessary to repair or replace a process control device to establish adequate control within the process control loop. However, it is not usually very easy to measure process control loop parameters, such as friction, dead band and dead time to monitor the health of process control devices when those devices are connected on-line within a control loop.

In the past, operators have had to remove a process control device from a control loop to bench test the device or, alternatively, control loops have been provided with bypass valves and redundant process control devices to make it possible to bypass a particular process control device to thereby test that device while the process is operating. Alternatively, operators have had to wait until a process is halted or is undergoing a scheduled shut-down to test the individual process control devices within the process. Each of these options is time consuming, expensive, and still only provides intermittent measurement of the parameters of the individual process control devices required to determine the health of those control devices.

There have been some attempts to collect data from a process control device on-line and to obtain an indication of characteristics of a device therefrom. For example, U.S. Pat. No. 5,687,098 to Grumstrup et al. discloses a system that collects device data and constructs and displays the response characteristic of the device. Likewise, application Ser. No. 08/939,364 filed Sep. 29, 1997 entitled "Method of and Apparatus for Nonobtrusively Obtaining On-Line Measurements of a Process Control Device Parameter," upon which this application relies for priority purposes, discloses a system that collects device data on-line and uses this data to directly calculate certain device parameters, such as dead band, dead time, etc. The disclosure of application Ser. No. 08/939,364 (which is assigned to the assignee of the present invention) and specifically that related to the apparatus and method for obtaining on-line measurements of a process control device parameter (i.e., the disclosure related to FIGS. 1–3) is hereby expressly incorporated by reference herein.

SUMMARY OF THE INVENTION

The present invention is directed to a method of and an apparatus for statistically determining estimates of one or more process loop parameters, such as friction, dead band, dead time, oscillation, shaft windup or backlash of a process control device while the process control loop is connected on-line within a process environment. Operation of the present invention enables a process operator to nonobtrusively monitor the health of one or more process control devices within a process in a continuous manner without having to remove the process control devices from the control loop, without having to bypass the process control devices in the control loop, without having to introduce exogenous control signals into the control loop and without having to shut the process down or interfere with the process m any other way.

According to one aspect of the present invention, a method of and apparatus for determining an estimate of a parameter associated with a process control loop measures a signal within the process control loop when the process control loop is connected on-line within a process control environment, stores the measured signal as signal data and then performs a statistical analysis on the stored signal data to determine the parameter estimate.

The parameter estimate may be an estimate of the friction of a device (such as a valve or other device) having an actuator (which may be any moveable part of the device) that moves in response to actuator pressure. In this case, the method or apparatus measures a first signal indicative of actuator pressure, measures a second signal indicative of actuator position and then stores a series of data points, each data point having an actuator pressure component derived from the actuator pressure signal and an actuator position component derived from the actuator position signal. The method or apparatus then may create a reduced data set from the series of data points and determine the friction estimate from the reduced data set. To create the reduced data set, each of the series of data points is analyzed to determine if the data point is outside of a friction zone of the device and is placed within the reduced data set if the point is outside of the friction zone. To determine if a data point is outside of the friction zone, the difference between the actuator position components of two data points may be compared to a threshold, the difference between the actuator pressure components of two data points may be compared to a threshold or the slope at a data point may be compared to a slope threshold.

Thereafter, the reduced data set may be detrended to remove linear trends, the actuator pressure components of the detrended data set may be histogrammed and a pressure difference based on the results of the histogram may be used to determine the friction estimate.

The parameter estimate may also be a dead band estimate which can be determined from the friction estimate and the open loop gain associated with the process control loop. Likewise, the parameter estimate may be a dead time estimate which can be developed by performing a cross-correlation analysis or a sum squared error analysis on the stored signal data and selecting a time delay associated with the cross-correlation analysis or the sum squared error analysis as the dead time estimate. Still further, the parameter estimate may be an oscillation estimate determined by performing an auto-correlation analysis on the stored signal data to produce an auto-correlation function and observing if the auto-correlation function is periodic.

The parameter estimate may also be a shaft windup estimate of a device that has an actuator. In this case, the stored signal may be an indication of the actuator position and the shaft windup estimate may be determined by identifying a plurality of consecutive data points that lie within a shaft windup span and computing the shaft windup based on a difference between the actuator position of the end points of the plurality of consecutive data points. If desired, the plurality of consecutive data points that lie within a shaft windup span may be determined by computing the slope at each of the consecutive data points and comparing the computed slope to a slope threshold.

The parameter estimate may also be an indication of whether dead band associated with a system is located within a forward or a feedback portion of a control loop and, therefore, whether the dead band is due to, for example, packing within a valve or backlash within an actuator or a positioner. The location of the dead band may be observed by determining whether a characteristic dead band loop is formed in a clockwise or a counterclockwise direction.

DETAILED DESCRIPTION

Figure 1:
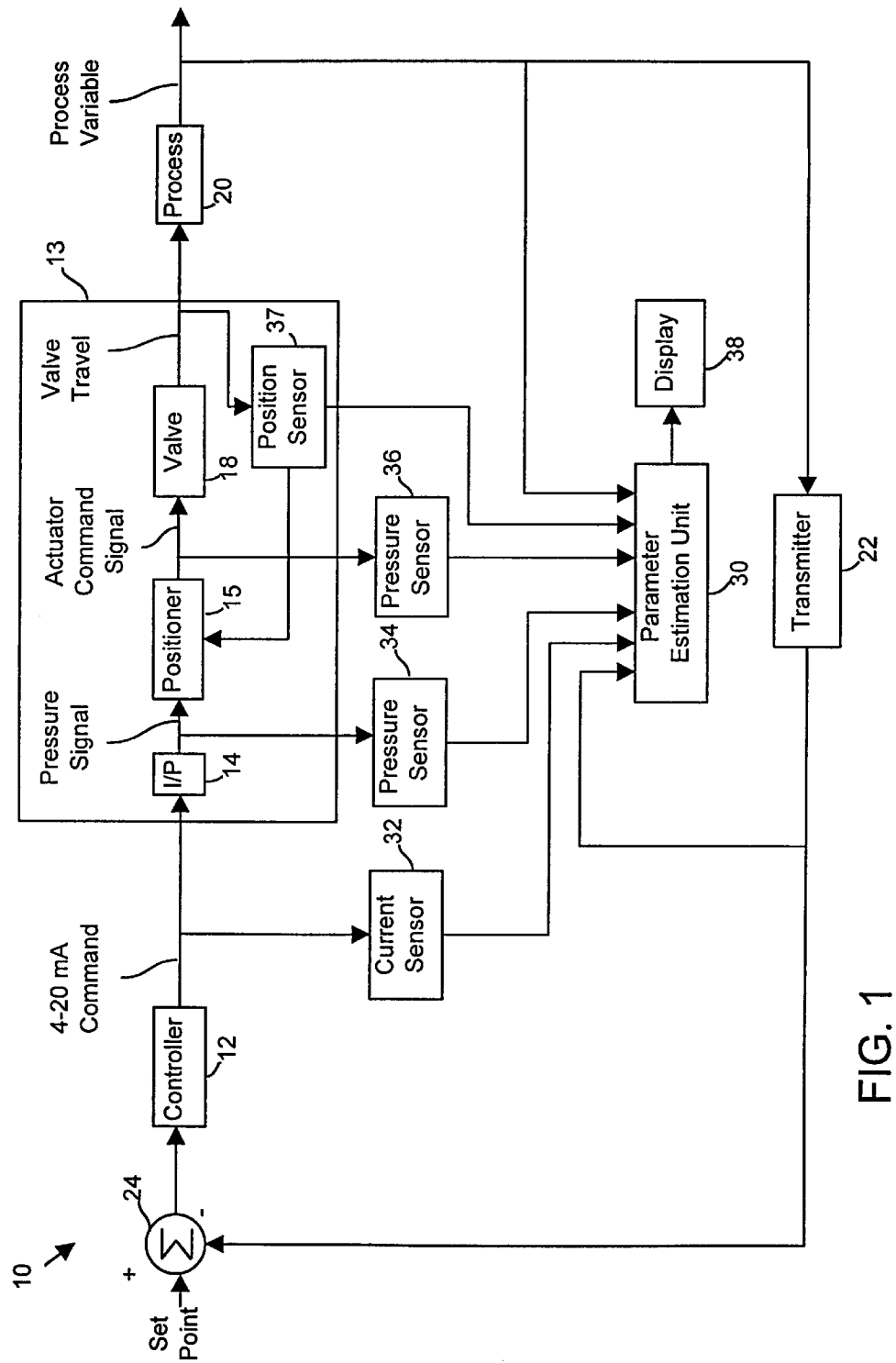
FIG. 1 is a block diagram of a process control loop including a device that statistically determines estimates for one or more loop parameters according to the present invention.

Referring to FIG. 1, a single-input, single-output process control loop 10 is illustrated as including a process controller 12 that sends, for example, a 4 to 20 mA command signal to a process control device 13. The process control device 13 is illustrated as including a current-to-pressure transducer (I/P) 14 that (typically) sends a 3 to 15 psig pressure signal to a valve positioner 15 which, in turn, pneumatically controls a valve 18 with a pressure signal (air). Operation of the valve 18 controls the articulation of a movable valve member disposed therein (not shown) which, in turn, controls a process variable within a process 20. As is standard, a transmitter 22 measures the process variable of the process 20 and transmits an indication of the measured process variable to a summing junction 24. The summing junction 24 compares the measured value of the process variable (converted into a normalized percentage) to a set point to produce an error signal indicative of the difference therebetween. The summing junction 24 then provides the calculated error signal to the process controller 12. The set point, which may be generated by a user, an operator or another controller is typically normalized to be between 0 and 100 percent and indicates the desired value of the process variable. The process controller 12 uses the error signal to generate the command signal according to any desired technique and delivers the command signal to the process control device 13 to thereby effect control of the process variable.

While the process control device 13 is illustrated as including a separate I/P unit 14, positioner 15 and valve 18, the process control device 13 may include any other type of valve mechanisms or elements instead of or in addition to those illustrated in FIG. 1 including, for example, an electronic positioner having an I/P unit integrated therein. Furthermore, it should be understood that the process control device 13 may be any other type of device (besides a valve controlling device) that controls a process variable in any other desired or known manner. The process control device 13 may be, for example, a damper, etc.

According to the present invention, a parameter estimation unit 30 is coupled to the process control device 13 or to any other part of the process control loop 10 using known sensors. The parameter estimation unit 30, which may be a computer such as a microcomputer having a memory and a processor therein, collects data pertaining to the condition of the devices within the process control loop 10 and statistically determines from the collected data one or more process control loop parameters, such as friction, dead time, dead band, etc. using, for example, a computer program or algorithm. For example, as illustrated in FIG. 1, the measurement unit 30 may detect one or more of the command signal delivered to the I/P unit 14 using a current sensor 32, the pressure output from the I/P unit 14 using a pressure sensor 34, the actuator command signal output by the positioner 15 using a pressure sensor 36, and the valve position at the output of the valve 18 using a position sensor 37. If desired, the estimation unit 30 may also or alternatively detect the set point signal, the error signal at the output of the summing junction 24, the process variable, the output of the transmitter 22 or any other signal or phenomena that causes or indicates movement or operation of the process control device 13 or process control loop 10. It should also be noted that other types of process control devices may have other signals or phenomena associated therewith that may be used by the parameter estimation unit 30.

As will be evident, the parameter estimation unit 30 may also read an indication of the controller command signal, the pressure signal, the actuator command signal, or the valve position already provided by the positioner 15 if the positioner 15 can communicate those measurements. Likewise, the estimation unit 30 may detect signals generated by other sensors already within the process control device 13, such as the valve position indicated by the position sensor 37. Of course, the sensors used by the estimation unit 30 can be any known sensors and may be either analog or digital sensors. For example, the position sensor 37 may be any desired motion or position measuring device including, for example, a potentiometer, a linear variable differential transformer (LVDT), a rotary variable differential transformer (RVDT), a Hall effect motion sensor, a magneto resistive motion sensor, a variable capacitor motion sensor, etc. It will be understood that, if the sensors are analog sensors, the estimation unit 30 may include one or more analog-to-digital convertors which samples the analog signal and store the sampled signal in a memory within the estimation unit 30. However, if the sensors are digital sensors, they may supply digital signals directly to the estimation unit 30 which may then store those signals in memory in any desired manner. Moreover, if two or more signals are being collected, the estimation unit 30 may store these signals as components of data points associated with any particular time. For example, each data point at time $T_1, T_2, \ldots T_n$ may have an input command signal component, a pressure signal component, an actuator travel signal component, etc. Of course, these data points or components thereof may be stored in memory in any desired or known manner.

Furthermore, while the estimation unit 30 has been indicated as being separate from the process control device 13 (such as, for example, being located in a host device), this unit can instead be internal to the process control device 13 or any other process control device (e.g., field device) in a process control network. If the process control device 13 is a micro-processor based device, the estimation unit 30 can share the same processor and memory as that already within the process control device 13. Alternatively, the estimation unit 30 may have its own processor and memory. Thus, it is contemplated that the statistical analysis may be performed in the device in which the measurements are made (such as in any field device) with the results being sent to a user display or to a host device for use or, alternatively, the signal measurements may be made by a device (such as a field device) with such measurements then being sent to a remote location (such as a host device) where the statistical analysis is performed.

The parameter estimation device 30 determines the friction, dead band, dead time or other process control loop parameter of the process control device 13 (or other device within the process control loop 10) using a statistical analysis based on measurements taken while the process control device 13 is operating on-line within a process environment. In general, to develop a parameter estimate, the estimation unit 30 samples one or more signals within, for example, the process control device 13 and stores the sampled data in memory. If desired, the estimation unit 30 may massage the data to eliminate unneeded data, outliers, etc. either before or after storing the collected data in memory. After collecting enough data to be able to determine a statistical estimate of a desired process parameter, the estimation unit 30 uses a statistical analysis routine, which may be stored in a memory associated with the estimation unit 30 and implemented on a microprocessor within the estimation unit 30, to calculate an estimate of the process parameter. Of course the estimation unit 30 may use any desired statistical analysis routine or procedure. Some example statistical analysis routines for certain parameters which may be implemented using an appropriately written computer program or algorithm stored within and implemented by the estimation unit 30 will be discussed in more detail herein.

After calculating the parameter estimate, the estimation unit 30 may display the estimate on a display device 38 which may be, for example, a CRT screen, a printer, a voice generator, an alarm, or any other desired communication device. Of course, the estimation unit 30 may alert the user to the value of the estimate in any other desired manner. If desired, the estimation unit 30 may compare the calculated parameter to one or more stored values to determine if the measured parameter is acceptable or is within a specified range. If the determined parameter is not within the specified range or is greater than (or less than) a threshold, the estimation unit 30 may alert a user via the display 38 that the process control device 13 (or other component of the process loop 10) needs to be repaired or replaced.

Because the estimation unit 30 takes measurements of the required data while the process control device 13 is operating on-line, the estimation unit 30 does not require the process control device 13 to undergo a full stroke or test stroke sequence to determine friction, dead band, dead time, etc. and does require the process control device 13 to be taken off-line or out of the normal operating environment. Furthermore, because the estimation unit 30 is connected to the process control loop 10 and measures the signals necessary to make the statistical estimation of certain process parameters during normal operation of the process control loop 10, the estimation unit 30 determines the process control device parameters continuously without interfering with the operation of the process 20 or the process control loop 10.

While the parameter estimation unit 30 may be programmed or configured to determine any desired process or device parameter using any desired statistical analysis, particularly useful statistical approaches for determining a friction estimate, a dead band estimate, a dead time estimate, an oscillation estimate and a shaft windup estimate are described in detail herein. However, the present invention is not limited to the use of any of these approaches and, furthermore, is not limited to the determination of estimates for only these specific parameters; it being understood that other statistical approaches can by used to determine these or other device or process parameters according to the present invention.

One approach to determining a friction estimate for a process control device, such as a sliding stem valve or a rotary valve, is to have the estimation unit 30 collect data pertaining to the actuator travel or position (sensed by, for example, the position sensor 37 of FIG. 1) and the actuator pressure (sensed by, for example, the pressure senor 34 or 36 of FIG. 1) for the valve over a particular time period. Typically, the collected data will be stored in memory as a series of data points, wherein each data point has an actuator pressure component derived from the measured actuator pressure signal and an actuator position component derived from the measured actuator position or travel signal. Of course, it will be understood that the actuator pressure and actuator position components of any data point should relate to the same time. Thus, it is preferable, when using two or more measured signals, to sample those signals at the same time to thereby produce time correlated data.

Figure 2:
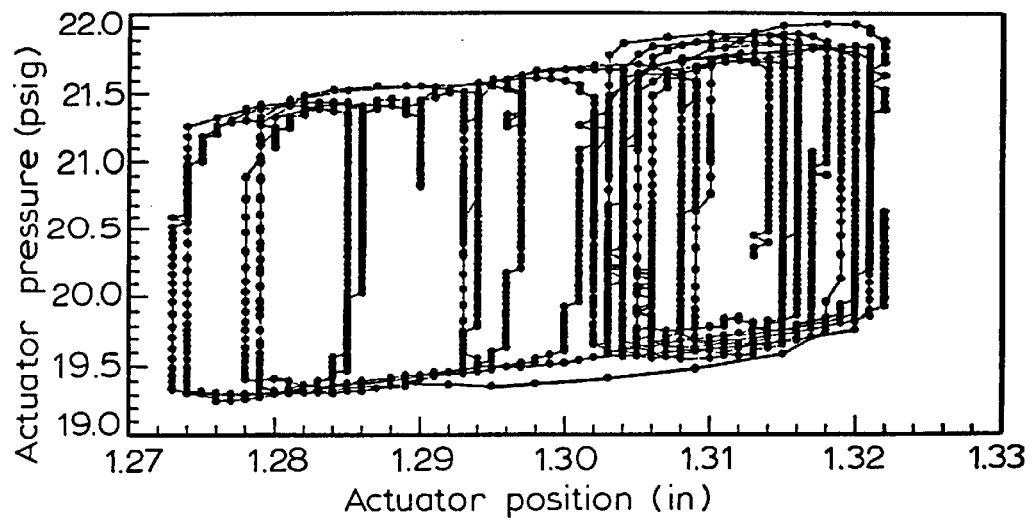
FIG. 2 is a graph illustrating a plot of actuator pressure versus actuator position for a typical sliding stem valve.
Figure 3:
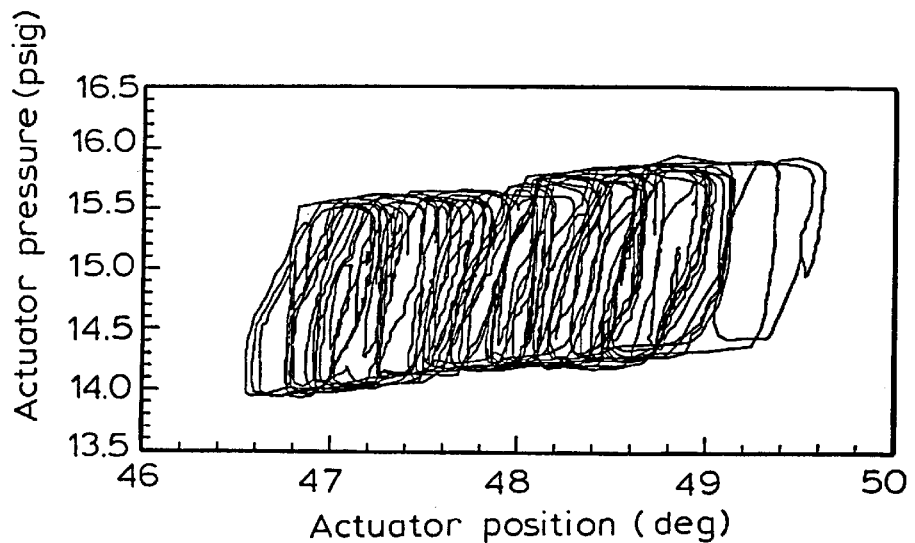
FIG. 3 is a graph illustrating a plot of actuator pressure versus actuator position for a typical rotary valve.

FIG. 2 illustrates a plot of actuator pressure versus actuator position for a typical sliding stem valve while FIG. 3 illustrates a plot of actuator pressure versus actuator position for a typical rotary valve. As will be seen in FIGS. 2 and 3 and as will be understood by those skilled in the art, upon a reversal of direction, the moveable element of the valve operates through a friction zone in which the applied pressure increases or decreases a significant amount with little or no resulting movement of the moveable valve element. This friction zone, which is caused by friction within the valve, is generally indicated by the more vertical lines in FIGS. 2 and 3. Upon exiting the friction zone, the moveable valve member then moves a significant amount with relatively little change in the applied pressure. This operation is generally indicated by the more horizontal lines in FIGS. 2 and 3. As will be understood, FIGS. 2 and 3 illustrate the operation of the moveable valve element during a plurality of cycles in which the moveable valve element operated through the friction zone. Of course, as is known, the location of the friction zone of a valve depends upon the position of the moveable valve element with respect to the operating range of that element.

After collecting data for the actuator pressure and actuator travel or position, the data points within the friction zone are discarded to thereby leave data generally corresponding to that which borders or to that which is outside the friction zone. The approach for selecting the reduced data set differs slightly depending upon whether the valve is a sliding stem valve or a rotary valve. For a sliding stem valve, the sliding stem is typically stationary within the friction zone. As a result, for a these types of valves, the reduced data set may be formed by including only those points at which actuator movement is actually occurring. A point may be included in this set, for example, if the difference between the actuator position of the point and the actuator position of the previous point exceeds a predetermined threshold. For example, when the difference between the actuator position of consecutive points exceeds 0.01% of full travel, the second point may be selected as a point within the reduced data set (i.e., wherein the actuator is actually moving). Of course, any other desired threshold may be used and any other method of determining actuator movement may be used instead to generate the reduced data set.

For a rotary valve, the data that outlines or borders the friction zone may be determined by evaluating one or more conditions. First, the slope of the actuator pressure versus actuator position may be computed at each point and then compared to a threshold. The slope at a point may be computed by determining the point-to-point slope at a given point (i.e., the slope of a line drawn between the point in question and the previous or next point), by taking the slope of a best fit line (such as a line developed using a least squared error analysis) determined from the point in question and two or more surrounding points or in any other desired manner. If the computed slope at a point is less than the threshold, then the point may be chosen for the reduced data set because that point is outside of the friction zone. On the other hand, if the slope is greater than the slope threshold, then the data point is within the friction zone and may discarded. If desired, the slope threshold may be predetermined or predefined (e.g., by an operator) or may be computed as the slope of a best line fit (e.g., a least squared error line) through all of the collected data.

Second, the change in pressure between consecutive points may be calculated and, if the pressure change is greater than a predetermined threshold of, for example, 0.05%, then the point is considered to be within the friction zone. It will be understood that one or both of these conditions may be used to determine if a point is within the friction zone or not. Thus, for example, if either the slope threshold or the pressure threshold of a point is exceeded, then the point may be considered to be within the friction zone and discarded. Alternatively, a point may be considered to be within the friction zone only when both the slope and the pressure threshold are exceeded. Furthermore, if desired, either or both of these approaches may be used with sliding stem valves.

Figure 4:
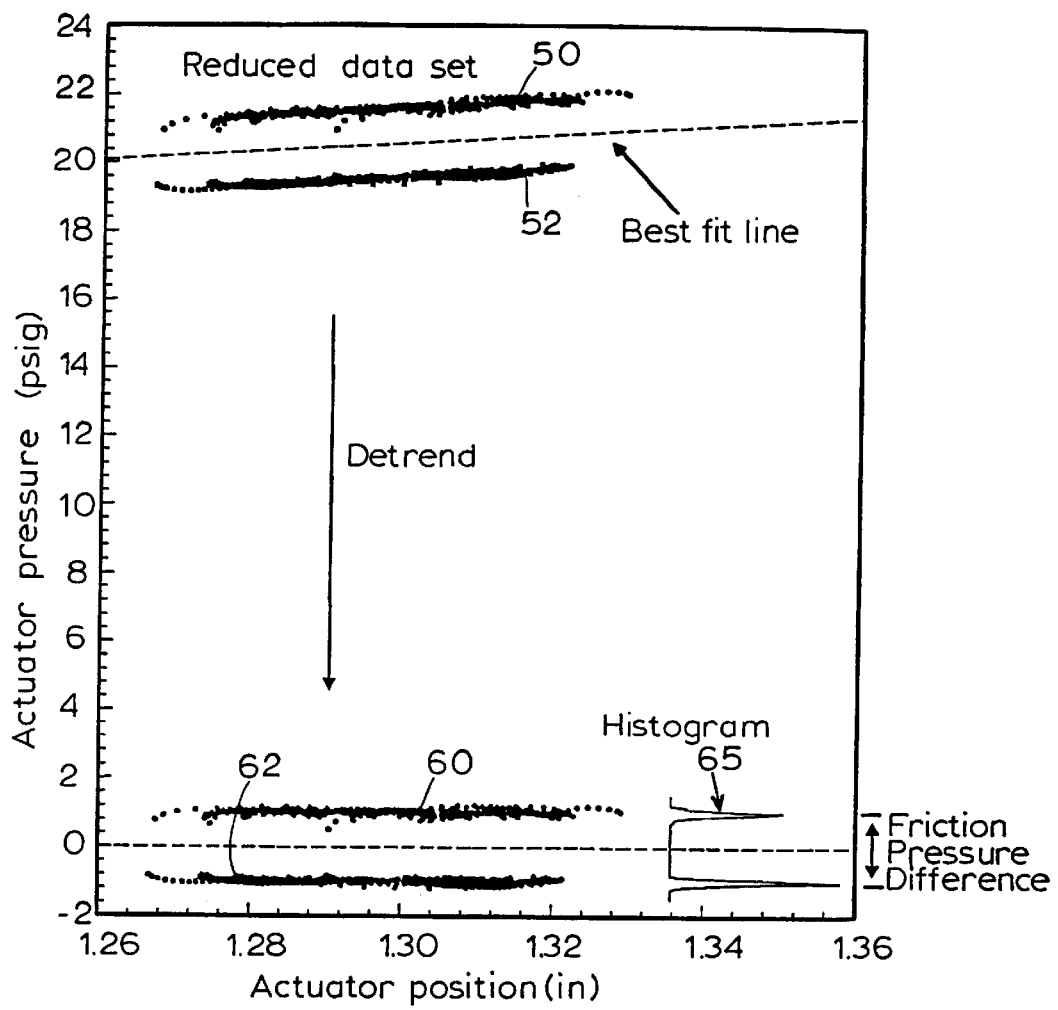
FIG. 4 is a combined graph illustrating the computational steps performed in statistically determining a friction estimate for a device according to the present invention.

After generating the reduced data set as described above, the remaining data points typically fall within one of two clusters bordering the friction zone of the valve device. Referring now to the top of FIG. 4, two clusters 50 and 52 associated with a reduced data set developed from the data set plotted in FIG. 2 are illustrated. The cluster 50 borders the top of the friction zone while the cluster 52 borders the bottom of the friction zone. As can be seen in FIG. 4, the two clusters 50 and 52 are separated by an empty zone (corresponding to the friction zone) and generally each of the clusters 50 and 52 has a slope associated therewith.

After the reduced data set is formed, it is beneficial to detrend the data, that is, remove any linear trends caused by, for example, the actuator spring force (which varies over the range of the actuator movement). The data can be detrended by calculating a best fit line based on the data in each cluster and then shifting the data to have a slope of approximately zero. The data can also be shifted to remove actuator pressure bias. With the linear trends removed, the two clusters of data 50 and 52 are shifted to be centered around zero pressure and to have a slopes of approximately zero, as illustrated by the clusters 60 and 62 at the bottom of FIG. 4. Of course the data can be detrended in any other desired manner.

There are many approaches to estimating the best fit line to the data for detrending the data. For example, one approach is to calculate the best fit line through all of the data within the reduced data set. However, the line estimate generated by this procedure tends to skew easily and often does not slice the band of data into two equal halves. It is preferable, therefore, to fit a separate line to the data on each side of the friction zone, i.e., use a separate line fit routine for each of the clusters 50 and 52 of FIG. 4. Also preferably, the line fit algorithm is designed to assure that the slopes of both the resulting best fit lines are equal. This result can be accomplished by slightly modifying the linear least squares curve fitting algorithm, as will be known by those skilled in the art.

After the data are detrended, a histogram of actuator pressure may be applied to the detrended data. Such a histogram, which is illustrated generally by reference numeral 65 at the lower, right-hand side of FIG. 4, shows that the detrended, reduced data set includes a high population of points at the outer edges of the friction zone. Such a histogram will generally include two distinct peaks, the difference of which represents the pressure difference to be used in determining the friction estimate. That is, when a histogram method is used, the pressure difference for use in determining the friction estimate is represented as the difference between the peaks of the bi-modal histogram distribution. If the peaks are not well-defined, a better approach is to compute the mean pressure value of each side of the bi-modal distribution and use the difference between the mean pressure values as the friction pressure difference. Of course, the median or other measurement may be used as well. As will be understood by those skilled in the art, the final friction estimate produced by the estimation unit 30 for a sliding stem valve is the friction pressure difference times the actuator effective area divided by two. Of course, dividing by two here is optional and is provided to accommodate a Coulombic model of friction. Generally speaking, estimated friction (lbf) is pressure difference (psid) times diaphragm area ($in^2$). For sliding stem valves, friction is typically reported in lbf while, for rotary valves, where frictional torque is involved, friction is typically reported in in-lbf.

While it is preferable to calculate the friction pressure difference using a histogram on the actuator pressure data because histogramming reduces some of the sensitivity of an imperfect curve fit, it is also possible to use the pressure separation between best fit lines calculated for the clusters 60 and 62 as an estimate for the friction pressure difference. Other measurements of the pressure difference, such as the difference between the pressure average of each cluster in the detrended data set, may also be used. Furthermore, while the procedure for determining a friction estimate for a valve device has been described herein, it will be understood that this same procedure could be used to measure the friction of any device having any type of moveable element or actuator therein, and is not limited to use with valves.

Generally speaking, the dead time of a process control loop or of a process control device is the time delay between the delivery of an input command signal to the process control device and the first change of the output of the device caused by the input command signal. To determine an estimate of the dead time of a process control device in a statistical manner according to one aspect of the present invention, the estimation unit 30 of FIG. 1 collects and stores data pertaining to an input command signal (such as that produced by the controller 12 and measured by the current sensor 32 of FIG. 1) and to the actuator travel or position signal (such as that measured by the position sensor 37 of FIG. 1). Of course the dead time may be determined using any other suitable signals. Thereafter, the estimation unit 30 performs a statistical correlation analysis, such as a cross-correlation analysis, on the signals to determine the time delay therebetween which produces the best correlation value.

If using a cross-correlation analysis to determine dead time, the estimation unit 30 may use the following equation to calculate an estimate of the cross-correlation value $\hat{R}_{xy}(k)$ associated with the time shift index k between two sampled signals x and y.

$$\hat{R}_{xy}(k) = \frac{1}{NT_s} \sum_{n=1}^{N} x(n)y(n+k)$$

wherein:

k=the discrete time shift index between the signals x and y;

$T_s$=the sampling period;

N=the total number of collected samples; and $\hat{R}_{xy}(k)$=the estimate of the cross-correlation value.

The time shift will, of course, be k times $T_s$. To determine the dead time of a device or a loop, the estimation unit 30 would calculate the cross-correlation value $\hat{R}_{xy}$ for a number of time shift indices k and then choose the time shift index k that maximizes the cross-correlation value $\hat{R}_{xy}$ as the dead time estimation.

Alternatively, the estimation unit 30 may use other correlation analyses to determine a dead time estimation. For example, the estimation unit 30 may use a sum squared error analysis on the two collected signals. In general, the sum squared error may be calculated as follows:

$$SSE_{xy}(k) = \sum_{n=1}^{N} [x(n) - y(n+k)]^2$$

wherein:

$SSE_{xy}$=the sum squared error between two signals x and y;

k=the time shift index; and

N=the number of time samples collected for the signals.

In this case, the value of k that minimizes the $SSE_{xy}$ may be used to estimate the dead time between the two signals, i.e., $T_d$=k*$T_s$ (where $T_d$ is the estimated dead time, k is the discrete time shift index and $T_s$ is the sample time). It has been found that using the summed squared error determination produces less variable results for slow moving signals and is better suited for estimating dead time based on data collected on-line within a process or a process control loop.

If desired, the dead time may be determined by splitting the collected data for the two signals into blocks of, for example, 250 points, calculating the dead time of each block of data and, thereafter, assigning the overall dead time of the system as the median (mean, etc.) of the computed dead times. If desired, the dead time may be continuously recalculated and filtered while the process is running. It is useful, for example, to apply a moving-average filter to several estimates of the dead time to reduce the variability in the estimates.

To determine a dead band estimation for the sliding stem valve or other device, one may assume that the majority of the dead band is caused by friction. With this assumption, the estimation unit 30 may estimate the friction of the device as described above and may then use the friction estimate and an estimate of the open loop gain of the device to determine the dead band estimate. To perform this calculation, the estimation unit 30 first converts the friction estimate into a percentage of the bench set span which may be calculated as:

$$\text{friction}(\% \text{ bench set span}) = \frac{(2 \cdot \text{friction estimate})/\text{actuator area}}{\text{bench set span}}$$

As is known, the bench set span is the difference in the pressure associated with the fully closed and fully open position of a valve or other device and is usually provided in psig per percent of full travel.

Using this equation, the minimum change in the input command signal that will overcome the friction to produce actuator movement (i.e., dead band) becomes:

$$\text{Dead Band} = \frac{\text{friction (\% bench set span)}}{\text{open loop gain}}$$

An expression for the open loop gain may be determined from off-line measurements, may be input by an operator into the estimation unit 30 or may be stored as a predetermined value within the estimation unit 30. Furthermore, if desired, any other open loop gain estimate developed in any other manner may be used instead.

The estimation unit 30 may also determine an oscillation estimate of any signal within the process control device 13, the process control loop 10 or the process 20 using an auto-correlation analysis. In general, the auto-correlation function of a periodic signal yields another periodic signal having the same period as the original signal. Thus, to detect whether a signal has some oscillatory behavior, the estimation unit 30 may collect samples for the signal, compute the auto-correlation function of the signal and then determine if the auto-correlation function is periodic.

Figure 5:
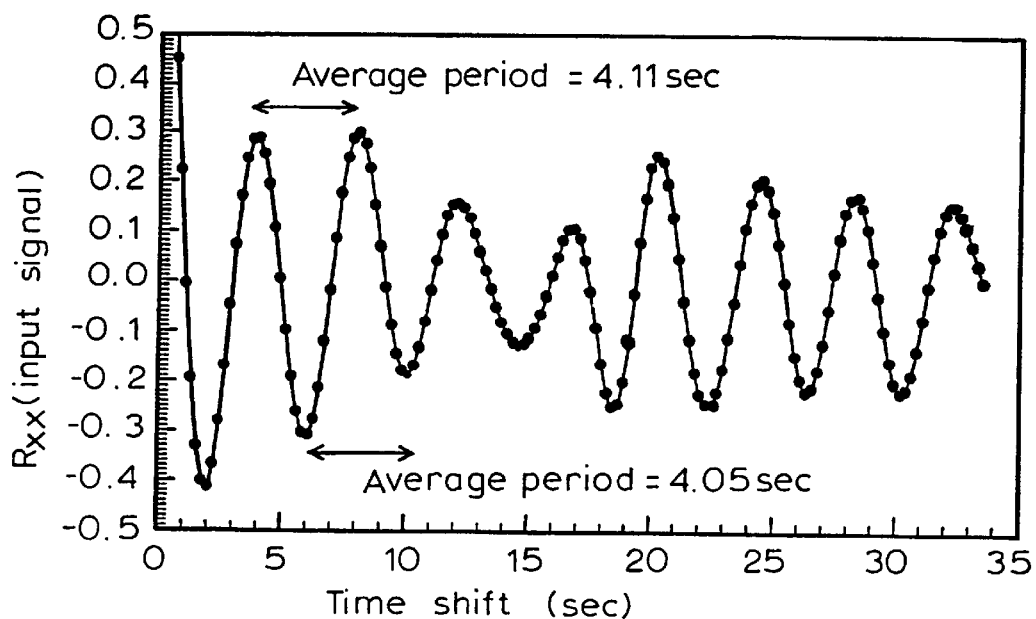
FIG. 5 is a graph illustrating the auto-correlation function of an input command signal for an unstable process control loop for use in statistically determining an oscillation estimate of a signal in the process control loop according to the present invention.

Referring to FIG. 5, an example auto-correlation function of an input command signal of an unstable process control loop (which may be calculated in any known or standard manner) is illustrated. To determine if an auto-correlation function such as that of FIG. 5 is periodic, the estimation unit 30 may compare the upper peak-to-peak period to the lower peak-to-peak period to determine the similarity between these values. The upper peak-to-peak period may be computed by determining the time spacing between each set of consecutive maximum points within the auto-correlation function and finding the average (or median) of these periods. Likewise, the lower peak-to-peak period may be computed by determining the time spacing between each set of consecutive minimum points of the auto-correlation function and finding the average (or median) of these periods. If the difference between (or the ratio of) the upper peak-to-peak period and the lower peak-to-peak period is within some bound or less than some minimal threshold, than the original signal may be considered to be oscillating at the period defined by the upper or lower peak-to-peak period. The oscillation estimate may simply indicate that the signal has (or does not have) some oscillatory behavior and may provide an estimate of the period of oscillation based on the upper and/or lower peak-to-peak period of the auto-correlation function.

While FIG. 5 illustrates the auto-correlation function of an input command signal, it will be understood that the estimation unit 30 can compute the auto-correlation function of any other desired signal such as the actuator command signal, the pressure signal, the actuator travel signal, the process variable, etc. to determine the oscillatory behavior of a process control device, a process control network or a process control loop.

Figure 6:
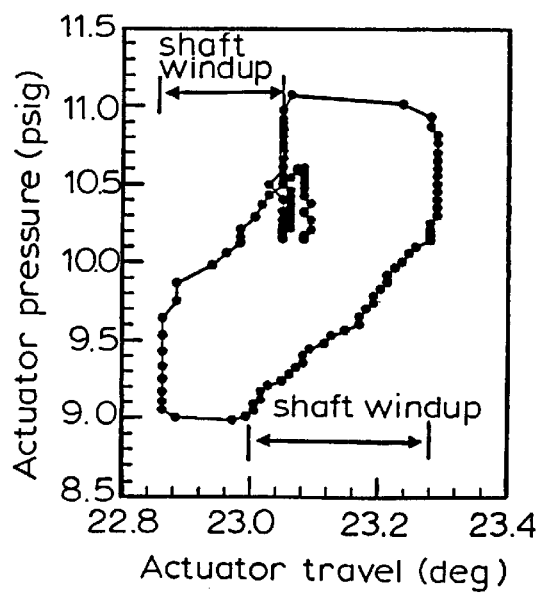
FIG. 6 is a graph illustrating a plot of actuator pressure versus actuator travel for a rotary valve for use in statistically determining a shaft windup estimate for a rotary valve according to the present invention.

The measurement unit 30 may determine an estimate of the shaft windup using actuator pressure and actuator travel data collected on-line from, for example, a rotary valve. FIG. 6 illustrates a plot of the actuator pressure versus actuator travel for movement of a rotary valve in one complete cycle through the friction zone. As illustrated in FIG. 6, shaft windup is the movement of the valve element which occurs before the actuator pressure reaches a maximum (or minimum) value which causes continued movement of the valve element. After collecting actuator pressure versus actuator travel data for a valve, the estimation unit 30 may compute the shaft windup at any particular occurrence and then estimate the shaft windup as the average or median of all shaft windup occurrences. To determine the shaft windup in any particular instance, the estimation unit 30 may monitor the slope of the actuator pressure versus the actuator travel curve. Shaft windup generally starts where the magnitude of the slope increases significantly (or becomes greater than a certain amount) and ends where the magnitude of the slope decreases significantly (or becomes less than a certain amount). As will be understood, the actuator travel movement (typically expressed as a percent of full travel) between the start and end points is the shaft windup for the particular occurrence.

Figure 7:
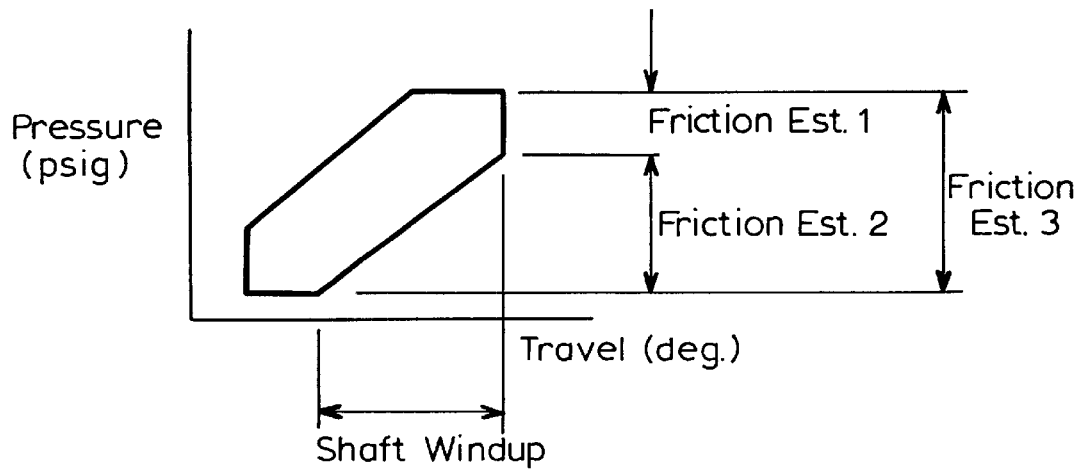
FIG. 7 is a graph illustrating a plot of actuator pressure versus actuator travel for an idealized loop of a rotary valve for use in statistically determining actuator bearing friction, ball seal friction and total friction for a rotary valve according to the present invention.

In addition to shaft windup, several values of friction can be estimated using data for the curve illustrated in FIG. 6. These friction estimates are illustrated in FIG. 7, which is a graph of an idealized rotary valve curve or loop. As illustrated in FIG. 7, friction estimate one is an estimate of the actuator bearing friction, friction estimate two is an estimate of the ball seal friction and friction estimate three is an estimate of the total valve/actuator friction. Friction estimate one (in-lbf) is pressure difference (psid) times actuator area (in$^2$) times moment arm length (in). Likewise, friction estimate two (in-lbf) is pressure difference (psid) times actuator area (in$^2$) times moment arm length (in). Friction estimate three is the sum of friction estimate one and friction estimate two. Of course, the friction estimates described herein may be reported in any desired manner and thus may be reported as the friction illustrated in FIGS. 4 and 7 or as that friction divided by two (to conform to a Coulombic model of friction).

The above identified friction estimates may be determined in a manner similar to the manner used to determine the shaft windup for the data associated with FIG. 6. In particular, consecutive collected data points associated with friction spans or zones can be determined by looking at the slope of the data (or at the pressure or travel change between two points) and then a friction estimate can be determined from the pressure difference between the end points of the data within the determined friction span or spans. Friction estimate one identified above is generally associated with a continuous span of data points having a very high slope (or close to zero travel). Friction estimate two identified above is generally associated with a continuous span of data having a slope between a low threshold and a high threshold (i.e., where there is some travel as well as some pressure change). The span associated with friction estimate two stops where the change in pressure reduces to approximately zero or below. Of course, not every data point within a continuous span needs to meet the slope (or other) criteria, if data points falling on either side of that data point meets the slope (or other) criteria.

Still further, the estimation unit 30 of FIG. 1 may determine the cause or location of dead band within a control loop and whether the dead band is in a forward path of the control loop and is caused by, for example, packing friction within a valve or, alternatively, whether the dead band is located in a feedback path of the control loop and is caused by, for example, backlash in an actuator or a positioner.

Figure 8:
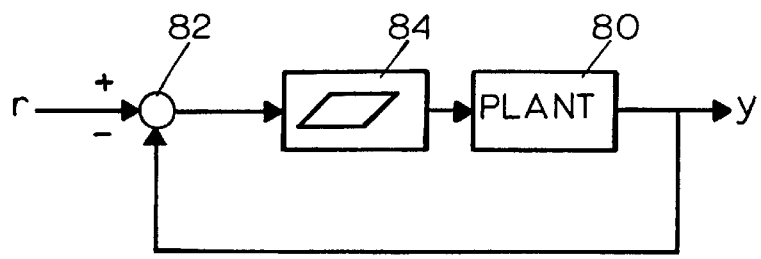
FIG. 8 is a block diagram of a typical stable system having dead band in the forward path.
Figure 9:
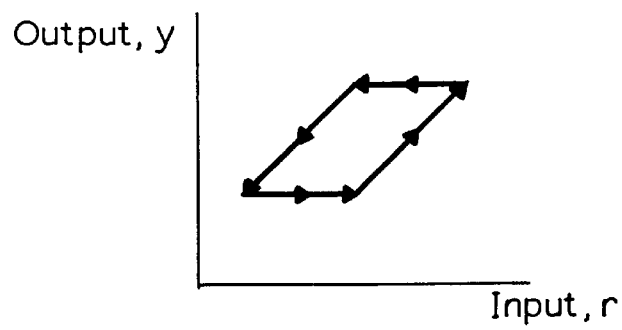
FIG. 9 is an illustration of an input/output curve for the system of FIG. 8.

Referring to FIG. 8, a stable system or plant 80 is in a control loop wherein an input signal r is provided to a summer 82 which, in turn, operates a control element 84 having dead band associated therewith. The control element 84 controls the plant 80, which produces an output signal y that is provided to the summer 82. As illustrated by the characteristic dead band loop within the element 84 of FIG. 8, the dead band is located in the forward path of the control loop. FIG. 9, illustrates an input/output curve (which may be produced by any standard dead band test) for the control loop of FIG. 8. As will be seen from FIG. 9, the input/output curve is formed or circulates counterclockwise, which indicates that the dead band is found in the forward path of the control loop. This phenomenon is most common in process loops in which the element 84 is a valve or is an element within a valve, r is the reference signal sent to the valve, the plant 80 is a flow loop and y is a process variable, such as flow. In this case, the dead band is caused by packing friction in the valve.

Figure 10:
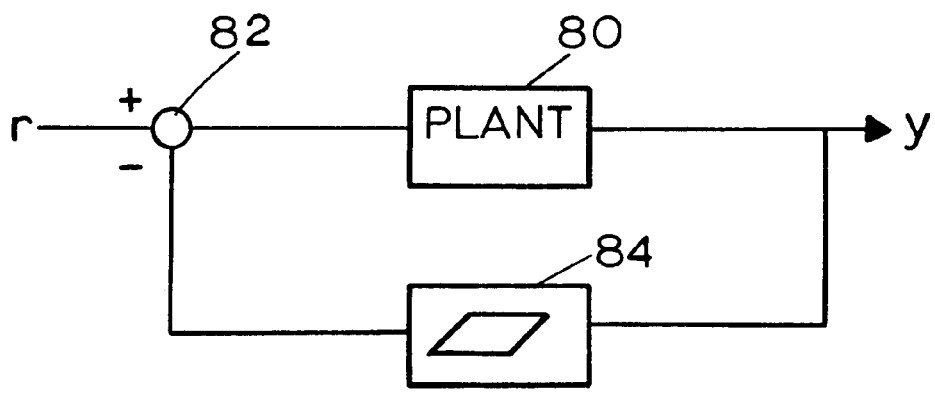
FIG. 10 is a block diagram of a typical stable system having dead band in the feedback path.
Figure 11:
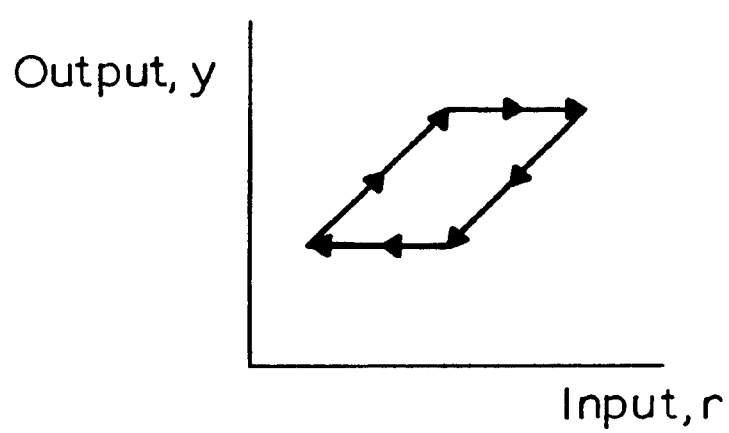
FIG. 11 is an illustration of an input/output curve for the system of FIG. 10.

FIG. 10 illustrates a stable control loop having dead band located in a feedback portion thereof (as illustrated by the placement of the element 84). As will be seen from FIG. 11, the input/output curve of the system of FIG. 10 is formed or circulates clockwise, which is a direct result of the fact that the dead band is located in the feedback path of the control loop of FIG. 10. This phenomenon might occur if there is backlash in the travel feedback linkage in a positioner or if there is backlash within an actuator associated with the control loop, as is the case with many scotch-yoke actuator designs.

To determine the location and potential type or cause of dead band within a system or control loop, the estimation unit 30 collects data points associated with an input signal of the control loop and data points associated with an output signal of the control loop and uses these data points in any manner to form an input/output curve associated with the system or control loop. Of course the data points associated with the input and output signals may be stored separately or together as desired but should generally be associated with the same or approximately the same time so as to form components of the input/output curve. In other words, each point in the input/output curve will generally have an input component and an output component measured or taken at the same or approximately the same time. Next, the estimation unit 30 determines if a dead band characteristic loop within the input/output curve is formed or circulates in the clockwise or the counterclockwise direction to determine the location of the dead band. As an example, the estimation unit 30 may collect and store data for the set point or output of the controller 12 of FIG. 1 (or any other desired signal) as an input signal of a closed loop and collect and store data for the process variable y of FIG. 1 (or any other desired signal) as an output signal of a closed loop, use these data points to form an input/output curve having a characteristic dead band loop therein (such as the loops illustrated in FIGS. 2, 3, 6, 7, 9 and 11) and then determine the manner in which the loop is formed, i.e., clockwise or counterclockwise. If the dead band loop is formed or circulates in the counterclockwise direction, the dead band is located in the forward path of a control loop and may be caused by, for example, packing friction in a valve. If the dead band loop is formed or circulates in a clockwise direction, the dead band is located in the feedback path of a control loop and may be due to, for example, backlash within a positioner or an actuator. By knowing whether the dead band is located in the forward path or the feedback path, it is possible to know whether, for example, an actuator should be replaced or whether the valve packing has to be replaced.

Whether the characteristic dead band loop is formed in the clockwise or counterclockwise direction may be determined in any desired manner. For example, the data points associated with a dead band loop may first be located by looking for movement of the data points associated with the input/output curve through a dead band zone. Thereafter, the points associated with the uppermost leg of the dead band loop (i.e., where there is significant movement in the input component with only minimal movement in the output component and the output component is at an approximate maximum) may be examined to see if the input component is increasing (clockwise movement) or decreasing (counterclockwise movement). Of course, any other or any number of the legs or portions of the input/output curve may be examined to determine or verify clockwise or counterclockwise movement of the input/output curve.

While the parameter estimation unit 30 has been described herein as determining an estimate for the friction, dead time, dead band, oscillation, shaft windup and backlash of a process control device, such as a valve device, it will be understood that other statistical analyses can be used to determine estimates for these or other process control device parameters, process control loop parameters and process parameters based on data measured on-line within a process or a process control loop.

Likewise, it will be understood that the parameter estimation unit 30 may be implemented as any desired hardwired logic device or software controlled processing device, such as a microprocessor, that is capable of detecting and storing one or more signals, and performing a statistical analysis on such signal(s). Preferably, the statistical analysis is performed by programming (of any desired type) stored within a computer-readable memory of the estimation unit 30. However, the analysis steps described herein or otherwise used may be implemented in software, hardware, firmware, or any combination thereof in any desired manner.

While the present invention has been described with reference to specific examples, which are intended to be illustrative only, and not to be limiting of the invention, it will be apparent to those of ordinary skill in the art that changes, additions or deletions may be made to the disclosed embodiments without departing from the spirit and scope of the invention.

What is claimed is:

1. A method of determining an estimate of a parameter associated with a process control loop including the steps of:
   measuring a signal within the process control loop when the process control loop is connected on-line within a process control environment;
   storing the measured signal as signal data;
   performing a statistical analysis on the stored signal data to determine the parameter estimate.

2. The method of claim 1, wherein the parameter estimate is an estimate of the friction of a device having an actuator that moves in response to actuator pressure, wherein the step of measuring includes the steps of measuring a first signal indicative of actuator pressure and measuring a second signal indicative of actuator position, wherein the step of storing includes the step of storing a series of data points, each data point having an actuator pressure component derived from the actuator pressure signal and an actuator position component derived from the actuator position signal, and wherein the step of performing the statistical analysis includes the steps of creating a reduced data set from the series of data points and determining the friction estimate from the reduced data set.

3. The method of claim 2, wherein the step of creating the reduced data set includes the steps of analyzing each of the series of data points to determine if the data point is outside of a friction zone of the device and creating the reduced data set to include those data points determined to be outside of the friction zone.

4. The method of claim 3, wherein the step of analyzing includes the step of determining a difference between the actuator position components of two data points and comparing the determined actuator position difference to a threshold.

5. The method of claim 3, wherein the step of analyzing includes the step of determining a difference between the actuator pressure components of two data points and comparing the determined actuator pressure difference to a threshold.

6. The method of claim 3, wherein the step of analyzing includes the step of computing a slope at a data point and comparing the computed slope to a slope threshold.

7. The method of claim 6, wherein the step of analyzing further includes the step of computing the slope threshold by determining a best fit line through the series of data points and choosing the slope threshold based on the slope of the determined best fit line.

8. The method of claim 2, wherein the step of determining the friction estimate includes the step of computing a best fit line for the reduced data set.

9. The method of claim 2, wherein the step of determining the friction estimate includes the steps of separating the data points of the reduced data set into two clusters and computing a best fit line for each of the clusters.

10. The method of claim 2, wherein the step of determining the friction estimate includes the step of detrending the reduced data set to remove linear trends.

11. The method of claim 10, wherein the step of determining the friction estimate further includes the step of histograming the actuator pressure components of the detrended data set, determining a pressure difference based on the results of the step of histograming and using the pressure difference to determine the friction estimate.

12. The method of claim 10, wherein the step of determining the friction estimate further includes the step of determining first and second clusters of data associated with the detrended data set, computing a best fit line for each of the clusters of data, determining a pressure difference from the computed best fit lines and using the determined pressure difference to determine the friction estimate.

13. The method of claim 2, further including the step of determining a dead band estimate based on the friction estimate and an estimate of open loop gain associated with the process control loop.

14. The method of claim 1, wherein the parameter estimate is a dead time estimate and wherein the step of performing the statistical analysis includes the step of performing a cross-correlation analysis on the stored signal data and selecting the dead time estimate based on a time delay associated with cross-correlation analysis.

15. The method of claim 1, wherein the parameter estimate is a dead time estimate and wherein the step of performing the statistical analysis includes the step of performing a sum squared error analysis on the stored signal data and selecting the dead time estimate based on a time delay associated with the sum squared error analysis.

16. The method of claim 1, wherein the parameter estimate is an oscillation estimate and wherein the step of performing a statistical analysis includes the steps of performing an auto-correlation analysis on the stored signal data to produce an auto-correlation function and determining if the auto-correlation function is periodic.

17. The method of claim 16, wherein the step of determining if the auto-correlation function is periodic includes the steps of measuring an upper peak-to-peak period of the auto-correlation function, measuring a lower peak-to-peak period of the auto-correlation function and comparing the measured upper peak-to-peak period with measured the lower peak-to-peak period.

18. The method of claim 1, wherein the parameter estimate is a shaft windup estimate of a device that has an actuator, wherein the signal comprises an indication of the actuator position and wherein the step of performing a statistical analysis includes the steps of identifying a plurality of consecutive data points that lie within a shaft windup span and computing the shaft windup based on a difference between the actuator position of end points of the plurality of consecutive data points.

19. The method of claim 18, wherein the step of identifying a plurality of consecutive data points that lie within a shaft windup span includes the step of computing the slope each of a group of data points and comparing the computed slope to a slope threshold.

20. The method of claim 18, wherein the step of performing a statistical analysis further includes the step of computing an individual shaft windup measurement for each of a plurality of cycles of the device from the stored signal data and statistically combining the individual shaft windup estimates to produce an overall shaft windup estimate.

21. The method of claim 1, wherein the parameter estimate is a friction estimate of a device that has an actuator moved by pressure, wherein the signal comprises an indication of the pressure and wherein the step of performing a statistical analysis includes the steps of identifying a plurality of consecutive data points that lie within a span and computing the friction estimate based on a difference between the pressure end points of the plurality of consecutive data points.

22. The method of claim 21, wherein the device is a rotary valve device and the friction estimate is an estimate of a bearing friction of the rotary valve device.

23. The method of claim 21, wherein the device is a rotary valve device and the friction estimate is an estimate of a seal friction of the rotary valve device.

24. The method of claim 1, wherein the parameter estimate is an indication of the location of a source of dead band within a control loop, wherein the signal includes an input signal of the control loop and an output signal of the control loop, wherein the stored signal data includes data associated with the input signal and the output signal and wherein the step of performing a statistical analysis includes the steps of using the stored signal data to form points within an input/output curve associated with the control loop and determining whether the input/output curve moves in a clockwise or in a counterclockwise direction.

25. An apparatus for determining an estimate of a parameter associated with a process control loop when the process control loop is connected on-line within a process environment, the apparatus comprising:
a sensor that measures a signal within a process control loop when the process control loop is connected on-line within the process environment;
a memory that stores the measured signal as signal data;
a processor that performs a statistical analysis on the stored signal data to determine the parameter estimate.

26. The apparatus of claim 25, wherein the parameter is friction of a device having an actuator that moves in response to actuator pressure.

27. The apparatus of claim 26, wherein the sensor detects an actuator pressure signal indicative of actuator pressure and detects an actuator position signal indicative of actuator position, wherein the memory stores a series of data points, each data point having an actuator pressure component derived from the actuator pressure signal and an actuator position component derived from the actuator position signal, wherein the processor includes further memory that stores a computer implementable algorithm and wherein the stored algorithm performs the steps of creating a reduced data set from the series of data points and determining the friction estimate from the reduced data set.

28. The apparatus of claim 26, wherein the algorithm further analyzes each of the series of data points to determine if the data point is outside of a friction zone of the device and creates the reduced data set to include those data points determined to be outside of the friction zone.

29. The apparatus of claim 28, wherein the algorithm detrends the reduced data set to remove linear trends.

30. The apparatus claim 29, wherein the algorithm separates the data points of the reduced data set into two clusters and computes a best fit line for each of the clusters and detrends the clusters using the computed best fit lines.

31. The apparatus of claim 29, wherein the algorithm histograms the actuator pressure components of the detrended data set, determines a pressure difference based on the results of the histogram and uses the pressure difference to determine the friction estimate.

32. The apparatus of claim 31, wherein the algorithm further determines a dead band estimate based on the friction estimate and an estimate of open loop gain associated with the process control loop.

33. The apparatus of claim 25, wherein the parameter estimate is a dead time estimate, wherein the processor includes a further memory that stores a computer implementable algorithm and wherein the stored algorithm performs the steps of performing a cross-correlation analysis on the stored signal data and selecting the dead time estimate based on a time delay associated with the cross-correlation analysis.

34. The apparatus of claim 25, wherein the parameter estimate is a dead time estimate, wherein the processor includes a further memory that stores a computer implementable algorithm and wherein the stored algorithm performs the steps of performing a sum squared error analysis on the stored signal data and selecting the dead time estimate based on a time delay associated with the sum squared error analysis.

35. The apparatus of claim 25, wherein the parameter estimate is an oscillation estimate, wherein the processor includes a further memory that stores a computer implementable algorithm and wherein the stored algorithm performs the steps of performing an auto-correlation analysis on the stored signal data to produce an auto-correlation function and determining if the auto-correlation function is periodic.

36. The apparatus of claim 25, wherein the parameter estimate is a shaft windup estimate of a device that has an actuator, wherein the signal comprises an indication of the actuator position and wherein the processor includes a further memory that stores a computer implementable algorithm that performs the steps of identifying a plurality of consecutive data points that lie within a shaft windup span and computing the shaft windup based on a difference between the actuator position of end points of the plurality of consecutive data points.

37. The apparatus of claim 25, wherein the parameter estimate is a friction estimate of a device that has an actuator moved by pressure, wherein the signal comprises an indication of the pressure and wherein the processor includes a further memory that stores a computer implementable algorithm that performs the steps of identifying a plurality of consecutive data points that lie within a span and computing the friction estimate based on a difference between the pressure end points of the plurality of consecutive data points.

38. The apparatus of claim 37, wherein the device is a rotary valve device and the friction estimate is an estimate of a bearing friction of the rotary valve device.

39. The apparatus of claim 37, wherein the device is a rotary valve device and the friction estimate is an estimate of a seal friction of the rotary valve device.

40. The apparatus of claim 25, wherein the parameter estimate is an indication of the location of a source of dead band within a control loop, wherein the signal includes an input signal of the control loop and an output signal of the control loop and wherein the processor includes a further memory that stores a computer implementable algorithm that performs the steps of using the stored signal data to form points within an input/output curve associated with the control loop and determining whether the input/output curve moves in a clockwise or in a counterclockwise direction.

41. The apparatus of claim 25, wherein the processor that performs the statistical analysis and the sensor are located in a single device.

42. The apparatus of claim 25, wherein the processor that performs the statistical analysis is located in a first device and the sensor is located in a second device that is remote from the first device.

43. A computer program stored on a computer readable medium for use in controlling a processor based on data stored in a memory associated with the processor, the program performing the steps of:
  reading from a memory data indicative of a signal associated with a process control loop operating on-line within a process control environment; and
  performing a statistical analysis on the data to produce an estimate of a parameter associated with the process control loop.

44. The computer program of claim 43, wherein the parameter is friction of a device having an actuator that moves in response to actuator pressure, wherein the data stored in the memory is a series of data points, each data point having an actuator pressure component and an actuator position component and wherein the computer program further performs the steps of creating a reduced data set from series of data points and determining the friction estimate from the reduced data set.

45. The computer program of claim 44, wherein the computer program further analyzes each of the series of data points to determine if the data point is outside of a friction zone of the device and creates the reduced data set to include those data points determined to be outside of the friction zone.

46. The computer program of claim 45, wherein the computer program detrends the reduced data set to remove linear trends.

47. The computer program of claim 46, wherein the computer program histograms the actuator pressure components of the detrended data set, determines a pressure difference based on the results of the histogram and uses the pressure difference to determine the friction estimate.

48. The computer program of claim 43, wherein the parameter estimate is a dead time estimate and wherein the computer program performs a cross-correlation analysis on the data and selects the dead time estimate based on a time delay associated with the cross-correlation analysis.

49. The computer program of claim 43, wherein the parameter estimate is a dead time estimate and wherein the computer program performs a sum squared error analysis on the stored signal data and selects the dead time estimate based on a time delay associated with the sum squared error analysis.

50. The computer program claim 43, wherein the parameter estimate is an oscillation estimate and wherein the computer program performs an auto-correlation analysis on the data to produce an auto-correlation function and determines if the auto-correlation function is periodic.

51. The computer program of claim 43, wherein the parameter estimate is a shaft windup estimate of a device that has an actuator and wherein the computer program performs the steps of identifying a plurality of consecutive data points that lie within a shaft windup span and computing the shaft windup based on a difference between the actuator position of end points of the plurality of consecutive data points.

52. The computer program of claim 43, wherein the parameter estimate is a friction estimate of a device that has an actuator moved by pressure and wherein the computer program performs the steps of identifying a plurality of consecutive data points that lie within a span and computing the friction estimate based on a difference between the pressure end points of the plurality of consecutive data points.

53. The computer program of claim 43, wherein the parameter estimate is an indication of the location of a source of dead band within a control loop, wherein the data includes first data components associated with an input signal of the control loop and second data components associated with an output signal of the control loop and wherein the computer program performs the steps of using the first and second data components to form points within an input/output curve associated with the control loop and determining whether the input/output curve moves in a clockwise or in a counterclockwise direction.

* * * * *

UNITED STATES PATENT AND TRADEMARK OFFICE
CERTIFICATE OF CORRECTION

PATENT NO. : 6,466,893 B1
DATED : October 15, 2002
INVENTOR(S) : Annette L. Latwesen et al.

It is certified that error appears in the above-identified patent and that said Letters Patent is hereby corrected as shown below:

<u>Column 1,</u>
Line 9, please delete "non obtrusively" and insert -- nonobtrusively --

<u>Column 3,</u>
Line 57, please delete "process m any" and insert -- process in any --

Signed and Sealed this

Ninth Day of December, 2003

JAMES E. ROGAN
*Director of the United States Patent and Trademark Office*